(12) United States Patent
Jones et al.

(10) Patent No.: US 7,656,861 B2
(45) Date of Patent: Feb. 2, 2010

(54) METHOD AND APPARATUS FOR INTERLEAVING TEXT AND MEDIA IN A REAL-TIME TRANSPORT SESSION

(75) Inventors: Paul Edwin Jones, Apex, NC (US); Rajesh Kumar, Palo Alto, CA (US); Mehryar Khalili Garakani, Westlake Village, CA (US); Herbert Michael Wildfeuer, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 673 days.

(21) Appl. No.: 10/982,620

(22) Filed: Nov. 3, 2004

(65) Prior Publication Data

US 2006/0007916 A1 Jan. 12, 2006

Related U.S. Application Data

(60) Provisional application No. 60/586,639, filed on Jul. 9, 2004.

(51) Int. Cl.
H04L 12/66 (2006.01)
(52) U.S. Cl. .................. 370/352; 370/401; 370/389; 379/52; 379/90.01
(58) Field of Classification Search .................. 370/389
See application file for complete search history.

(56) References Cited

U.S. PATENT DOCUMENTS

| 4,205,780 | A | 6/1980 | Burns et al. ............... 235/454 |
| 4,506,358 | A | 3/1985 | Montgomery |
| 4,991,169 | A | 2/1991 | Davis et al. |
| 5,121,385 | A | 6/1992 | Tominaga et al. |
| 5,157,759 | A | 10/1992 | Bachenko |
| 5,195,000 | A | 3/1993 | Suzuki |
| 5,282,244 | A | 1/1994 | Fuller et al. |
| 5,384,840 | A | 1/1995 | Blatchford et al. |
| 5,521,960 | A | 5/1996 | Aronow |
| 5,680,443 | A | 10/1997 | Kasday et al. |
| 5,694,548 | A | 12/1997 | Baughter et al. |
| 5,757,895 | A | 5/1998 | Aridas et al. |
| 5,799,317 | A | 8/1998 | He et al. |
| 5,822,420 | A | 10/1998 | Bolon et al. |

(Continued)

OTHER PUBLICATIONS

S. Bradner, "Intellectual Property Rights in IETF Technology", Feb. 2004, pp. 1-15.

(Continued)

Primary Examiner—Rafael Pérez-Gutiérrez
Assistant Examiner—German Viana Di Prisco
(74) Attorney, Agent, or Firm—Stolowitz Ford Cowger LLP

(57) ABSTRACT

Text is interleaved and transported along with media data over the same real-time Internet Protocol (IP) media transport session. A network processing device identifies text characters corresponding with text signaling. The identified text characters are formatted into text packets and sent over the same real-time IP media transport session used for real-time media transport. The media transport session can identify the sequence that the text characters are transmitted and can specify a maximum character transfer rate.

36 Claims, 5 Drawing Sheets

U.S. PATENT DOCUMENTS

| | | |
|---|---|---|
| 5,848,069 A | 12/1998 | Milne et al. |
| 5,905,476 A | 5/1999 | McLaughlin et al. |
| 6,052,458 A | 4/2000 | Amir-Ebrahimi |
| 6,081,591 A | 6/2000 | Skoog |
| 6,175,573 B1 | 1/2001 | Togo et al. |
| 6,188,760 B1 | 2/2001 | Oran et al. |
| 6,233,253 B1 | 5/2001 | Settle et al. |
| 6,236,672 B1 | 5/2001 | Hiramatsu |
| 6,266,343 B1 | 7/2001 | Caves |
| 6,351,471 B1 | 2/2002 | Robinett et al. |
| 6,351,495 B1 | 2/2002 | Tarraf |
| 6,393,000 B1 | 5/2002 | Feldman |
| 6,411,705 B2 | 6/2002 | Oran et al. |
| 6,421,425 B1* | 7/2002 | Bossi et al. ............... 379/52 |
| 6,438,137 B1 | 8/2002 | Turner et al. |
| 6,477,176 B1 | 11/2002 | Hamalainen et al. |
| 6,490,286 B1 | 12/2002 | Ono et al. |
| 6,501,779 B1 | 12/2002 | McLaughlin et al. |
| 6,545,616 B1 | 4/2003 | Haimi-Cohen |
| 6,546,082 B1 | 4/2003 | Alcendor et al. |
| 6,570,966 B1 | 5/2003 | Freeman et al. |
| 6,574,191 B1 | 6/2003 | Usukura et al. |
| 6,584,070 B1 | 6/2003 | Takashima et al. |
| 6,594,267 B1 | 7/2003 | Dempo |
| 6,603,739 B1 | 8/2003 | Dubuc |
| 6,614,808 B1 | 9/2003 | Gopalakrishna |
| 6,621,514 B1 | 9/2003 | Hamilton |
| 6,621,821 B1 | 9/2003 | Song |
| 6,639,916 B1 | 10/2003 | Wakizaka |
| 6,694,007 B2 | 2/2004 | Lang et al. |
| 6,707,821 B1* | 3/2004 | Shaffer et al. ............ 370/395.4 |
| 6,721,334 B1 | 4/2004 | Ketcham |
| 6,735,190 B1 | 5/2004 | Chuah et al. |
| 6,757,732 B1* | 6/2004 | Sollee et al. ............... 709/227 |
| 6,829,254 B1 | 12/2004 | Rajahalme et al. |
| 6,904,058 B2* | 6/2005 | He et al. ................... 370/477 |
| 7,007,235 B1* | 2/2006 | Hussein et al. .............. 715/751 |
| 7,065,185 B1 | 6/2006 | Koch |
| 7,088,710 B1 | 8/2006 | Johnson et al. |
| 7,174,004 B1* | 2/2007 | Michaelis ................... 379/52 |
| 7,187,697 B1* | 3/2007 | Aviely et al. ............... 370/517 |
| 7,193,973 B2* | 3/2007 | Nagai et al. ................ 370/252 |
| 7,359,370 B1 | 4/2008 | Renkel et al. |
| 7,391,784 B1 | 6/2008 | Renkel |
| 2002/0021700 A1* | 2/2002 | Hata et al. ............. 370/395.42 |
| 2002/0164002 A1 | 11/2002 | Beadle et al. |
| 2003/0096626 A1 | 5/2003 | Sabo et al. |
| 2003/0125952 A1 | 7/2003 | Engelke et al. |
| 2003/0158957 A1* | 8/2003 | Abdolsalehi ................ 709/231 |
| 2003/0198226 A1* | 10/2003 | Westberg ................... 370/393 |
| 2003/0198320 A1 | 10/2003 | Engelke et al. |
| 2004/0127233 A1 | 7/2004 | Harris et al. |
| 2004/0198323 A1 | 10/2004 | Himanen et al. |
| 2004/0228325 A1 | 11/2004 | Hepworth et al. |
| 2005/0002525 A1* | 1/2005 | Alkove et al. ................. 380/37 |
| 2005/0021826 A1 | 1/2005 | Kumar |
| 2005/0086699 A1* | 4/2005 | Hahn et al. ................. 725/106 |
| 2005/0114145 A1 | 5/2005 | Janakiraman et al. |
| 2005/0144247 A1* | 6/2005 | Christensen et al. ........ 709/207 |
| 2005/0190756 A1* | 9/2005 | Mundra et al. .............. 370/389 |
| 2005/0190893 A1 | 9/2005 | Stephens et al. |
| 2005/0195801 A1 | 9/2005 | Chu et al. |
| 2005/0232169 A1 | 10/2005 | McLaughlin et al. |
| 2005/0254635 A1 | 11/2005 | Koretsky et al. |
| 2006/0018307 A1* | 1/2006 | Michalewicz et al. ....... 370/352 |
| 2006/0058049 A1 | 3/2006 | McLaughlin et al. |
| 2006/0098792 A1 | 5/2006 | Frank et al. |
| 2006/0109783 A1* | 5/2006 | Schoeneberger et al. .... 370/217 |
| 2006/0114350 A1 | 6/2006 | Shimada et al. |
| 2007/0064090 A1 | 3/2007 | Park et al. |
| 2007/0127643 A1 | 6/2007 | Keagy |

OTHER PUBLICATIONS

G. Hellstrom and P. Jones, "RTP Payload for Text Conversation", Aug. 2004, pp. 1-25.

G. Hellstrom and P. Jones, "RTP Payload for Text Conversation Interleaved in an Audio Stream", Aug. 2004, pp. 1-26.

H. Schulzrinne, "RTP Payload for DTMF Digits, Telephony Tones and Telephony Signals", May 2000, pp. 1-27.

G. Hellstrom and P. Jones, "RTP Payload for Text Conversation", Aug. 2004, pp. 1-18.

G. Hellstrom and P. Jones, "RTP Payload for Text Conversation Interleaved in an Audio Stream", Aug. 2004, pp. 1-18.

H. Schulzrinne and S. Petrack, "RTP Payload for DTMF Digits, Telephony Tones and Telephony Signals," RFC 2833, May 2000, pp. 1-6, RFC Editor.

G. Hellstrom, "RTP Payload for Text Conversation," RFC 2793, May 2000, pp. 1-9, RFC Editor.

J. Rosenber, H. Schulzrinne, "An Offer/Answer Model with Session Description Protocol (SDP)," RFC 3264, Jun. 2002, pp. 1-14 and 19-20, RFC Editor.

H. Schulzrinne, S. Casner, R. Frederick, V. Jacobson, "RTP: A Transport Protocol for Real-Time Applications," RFC 3550, Jul. 2003, pp. 1, 8-10, 13, 16-17, RFC Editor.

ITU-T, "Text conversation and TextSET," Annex G, rev. Jul. 2003, pp. 196-202, International Telecommunication Union—Telecommunication Standardization Sector.

H. Schulzrinne, S. Casner, R. Frederick, V. Jacobson, "RTP: A Transport Protocol for Real-Time Applications," RFC 1889, Jan. 1996, pp. 1, 8, 11 and 13, RFC Editor.

S. Casner, V. Jacobson, "Compressing IP/UDP/RTP Headers for Low-Speed Serial Links," RFC 2508, Feb. 1999, pp. 1 and 4, RFC Editor.

J. Rosenberg, H. Schulzrinne, G. Camarillo, A. Johnston, J. Peterson, R. Sparks, M. Handley, E. Schooler, "SIP: Session Initiation Protocol," RFC 3261, Jun. 2002, pp. 1, 8, 24, 26-29, 7 8-80 and 206, RFC Editor.

ANSI/TIA-825-A (2003), A Frequency Shift Keyed Modem for use on the Public Switched Telephone Network.

ITU V.18, 112000, Operational and interworking requirements for DCEs operating in the text telephone mode.

ITU T.140, Protocol for Multimedia Application Text Conversation.

Section 508 of the U.S. Rehabilitation Act of 1973, http://www.section508.gov.

ITU V.150.0, Modem over IP Networks—A Foundation.

ITU V.150.1, Procedures for the end-to-end connection of V-series DCEs over an IP Network.

International reference alphabet (IRA): Information Technology—7-bit coded character set for information exchange.

ITU Y.1541, Network performance objectives for IP-based services.

RFC 2733, An RTP Payload Format for Generic Forward Error Correction.

IETF RFC 3407, Session Description Protocol (SOP) Simple Capability Declaration, Oct. 2002.

ITU-T Recommendation H.460.6 (2002), Extended Fast Connect.

ITU-T SG16QH-03001, Text over IP Requirements Specification.

ITU-T Recommendation H.323 (2000), Packet-based multimedia communications systems.

ITU-T Recommendation H.245 (2002), Control Protocol for Multimedia Communication.

ITU-T Recommendation F.700 Annex A.3 (2000), Multimedia framework, media descriptions.

ITU-T Recommendation F.703 (2000), Multimedia Conversational Service description.

QH16-03015, Study Group 16—Question H, Text over IP requirements specification—version 1.1.

Authors unknown, TIA Standard, "Transport of TIA-825-A Signals over IP Networks" (Draft), PN-3-0098 (T1A-1 00 I), 2004.

Hellstrom, G. et al., "RTP Payload for Text Conversion", IETF RFC 4103, Jun. 2005.

http://www.intel.com/network/csp/products/3940web.htm, "Intel Telecom Products: DIM IP Series Release 5.1," 7 pages.

http://www.tmcnet.com/articles/itmag/2ndQuarter/centerstage001.htm, "Internet Telephony Center Stage: Second Quarter 1998," 4 pages.

Stolowitz Ford Cowger LLP, Listing of Related Cases, Jul. 7, 2009.

International Search Report for PCT/US05/20789; International Searching Authority/US; Jul. 2006.

International Preliminary Report on Patentablility and Written Opinion of the International Search Authority for PCT/ US05/20789; International Searching Authority/US; Jul. 2006.

\* cited by examiner

METHOD AND APPARATUS FOR INTERLEAVING TEXT AND MEDIA IN A REAL-TIME TRANSPORT SESSION

This application claims priority from U.S. Provisional Ser. No. 60/586,639, filed Jul. 9, 2004.

BACKGROUND

Public Switched Telephone Network (PSTN) gateways must reliably transport a variety of signals over Internet Protocol (IP) networks. Previously, people have focused on transporting fax and modem signals. However, there is also a need to reliably transport signals emitted from PSTN textphone, or TTY/TDD, devices used by the deaf and hard of hearing.

PSTN gateways, alternatively referred as Voice Over IP (VoIP) gateways, compress audio signals from a PSTN network and convert the compressed audio signals into packets that are then transported over an IP network. Voice compression is effective when processing speech signals, but introduces problems when processing and transmitting PSTN signals representing text. In addition, the IP network may occasionally drop packets. This packet loss may be acceptable for voice data but may not provide acceptable character error rates for text transport.

A wide range of applications employ techniques for transporting text over IP, including e-mail, instant messaging, Internet Relay Chat, newsgroups, and Internet Engineering Task Force (IETF) Request For Comments (RFC) 2793 ("RTP Payload for Text Conversation"). Most of those applications are either not real-time (e.g., e-mail) or are quasi-real-time (e.g., Instant Messaging). Generally, the Instant Messaging applications and others in that category do not transport text character-by-character.

The Request for Comment (RFC) 2793 specifies a way of transporting text in real-time between two devices over a Real Time Transport Protocol (RTP) stream, but transports audio and text independently on separate RTP streams. Using dual RTP transport streams increases management complexity in the gateway and limits the number of audio/text calls that can be processed.

The present invention addresses this and other problems associated with the prior art.

SUMMARY OF THE INVENTION

Text is interleaved and transported along with other media data over the same real-time Internet Protocol (IP) media transport session. A network processing device identifies text characters corresponding to text signaling. The identified text characters are formatted into text packets and sent over the same real-time IP media transport session used for real-time media transport. The media transport session can identify the sequence that the text characters are transmitted and can specify a maximum character transfer rate.

The foregoing and other objects, features and advantages of the invention will become more readily apparent from the following detailed description of a preferred embodiment of the invention which proceeds with reference to the accompanying drawings.

DETAILED DESCRIPTION

Figure 1:
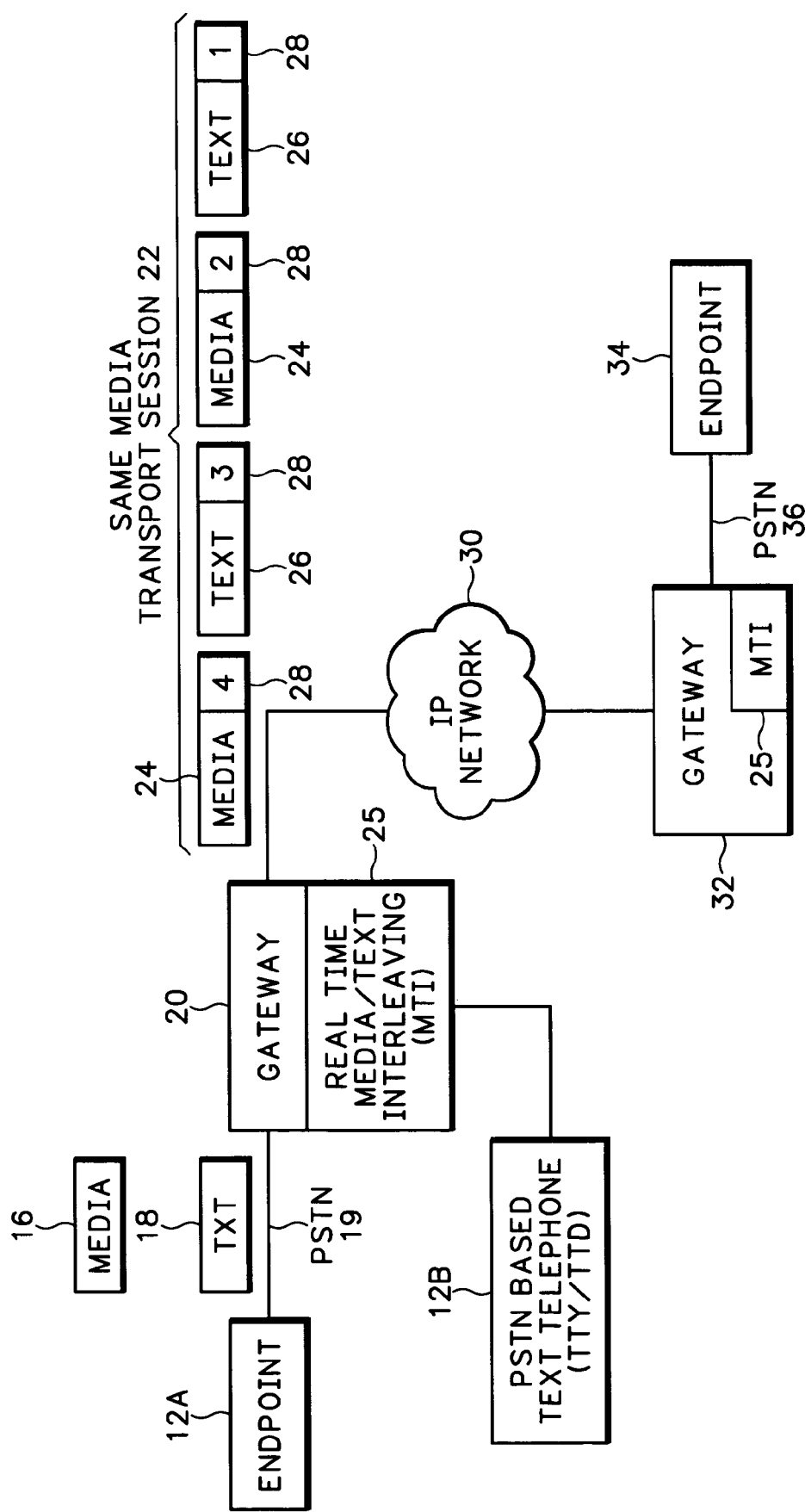
FIG. 1 is a diagram of a network that uses media/text interleaving (MTI) over the same real-time media session.

FIG. 1 shows real-time Media/Text Interleaving (MTI) 25 implemented in gateways 20 and 32 of an IP network 30. However, this is not always necessary, and there are other embodiments where some or all of the MTI 25 is implemented in endpoints or in other network processing devices.

The network shown in FIG. 1 includes one or more endpoints 12A and/or 12B that are connected via a Public Switched Telephone Network (PSTN) 19 to gateway 20. The endpoint 12A can be any type of computing system that is capable of sending text signals over a PSTN network 19. In one instance where the endpoint is connected directly to the IP network, the endpoint 12A could be a Voice Over Internet Protocol (VoIP) phone or a personal computer. The endpoint 12B in this example is a PSTN based text telephone that sends TTY/TTD signaling.

The gateway 20 is connected through an Internet Protocol (IP) network 30 to another gateway 32 that is connected through PSTN network 36 to an opposite endpoint 34. The PSTN networks 19 and 36 can be part of the same PSTN network or can be different circuit switched networks.

The endpoint 12 or the endpoint 34, either directly or through the use of a PSTN gateway, initiates a real-time media transport session 22 over the IP network 30. In one example, the real-time media transport session is a Real-time Transport Protocol (RTP) session and is initiated when the endpoint 12 dials the phone number of endpoint 34. However, it should be understood that the MTI system can be used in any type of real-time media session. After the media transport session 22 is established, the endpoint 12 may send text signals 18 or other media signals 16 over the PSTN network 19. Throughout the specification text data is referred to explicitly as "text", while all other forms of media, including audio, video, etc., are referred to collectively as "media".

In one example, the text signals 18 are audio tones that represent different text characters. The other media signals 16 typically carry voice signals from a person talking at the endpoint 12. However, the media signals 16 can alternatively be music, video, or some combination of both. The text conversation sent over the text signals 18 can be used alone or in connection with other conversational facilities such as video and voice sent over the media signals 16, to form multimedia conversation services.

The gateway 20 encodes the media signals 16 into digital data in a conventional manner and formats the encoded data into media packets 24. The process of encoding and formatting media signals into media packets is known to those skilled in the art and is therefore not described in further detail. The MTI operation 25 in the gateway 20 converts the PSTN text signals 18 into digital representations of text characters and formats the text characters into text packets 26. The text packets 26 are then interleaved with any media packets 24 that may be generated by the gateway 20 and sent over the same media transport session 22.

Thus, the gateways 20 and 32 only have to manage one media transport session 22 for both the text signals 18 and the other media signals 16. For example, the gateways 20 and 32 only have to manage one series of sequence numbers 28 and timestamps for both the media packets 24 and the text packets 26.

As described above, in one embodiment, the media session 22 may use the Real Time Transport Protocol (RTP) to transport both the media and text in RTP packets. The RTP protocol provides text arrival in correct order, without duplication, and with detection and indication of loss. It also includes an optional possibility to repeat data for redundancy to lower the risk of loss. Using RTP for text transmission in a multimedia conversation application achieves uniform handling of text and other media. This increases the possibility for prompt and proper media delivery.

It should be understood that other combinations of PSTN networks, IP networks, gateways and endpoints can also use some or parts of the MTI system 25. For example, one or both of the endpoints may be connected directly to the IP network 30 without having to go through intermediate gateways 20 or 32. In this example, the MTI 25 may operate within one or more of the endpoints 12 or 34. In another configuration, one of the endpoints may communicate directly over the IP network 30 and the opposite endpoint may be connected through one of the gateways to the IP network 30. In this example, the MTI system 25 may operate in one endpoint and in one opposite gateway.

There are a variety of techniques for transporting text over an IP network. The Media/Text interleaving operation may be considerably simpler for gateways to implement and ensures a higher degree of transparency with other network devices including Network Address Translation (NAT) devices and firewall devices.

Media/Text Interleaving (MTI) simplifies the amount of work required for providing text support on a PSTN gateway and allows for better synchronization between text and audio. The MTI system also provides a higher degree of probability that text media will be properly transmitted between two PSTN systems, since most NAT and firewall devices only support audio media.

Figure 2:
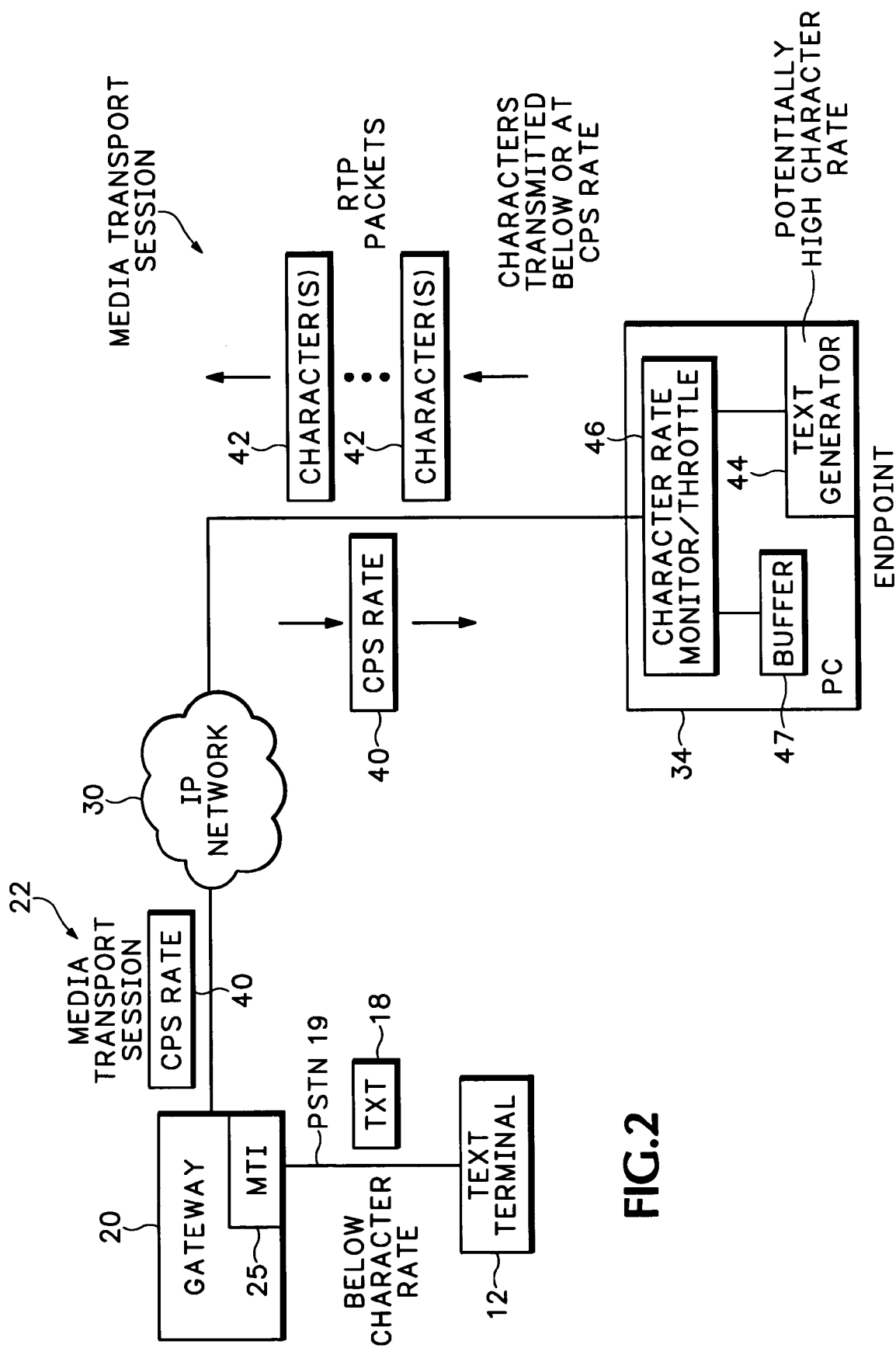
FIG. 2 is a diagram showing how a character rate is specified in the media/text interleaving session.

FIG. 2 shows another aspect of the MTI system 25 that specifies a Character Per Second (CPS) rate 40 in the media transport session 22. The CPS rate 40 controls flow rate over the transport session 22. The network shown in FIG. 2 shows one embodiment where the endpoint 12 is a text terminal, such as a TTY/TTD terminal. The text terminal 12 transmits text signals 18, such as Baudot tones, over the PTSN network 19 that correspond to text characters.

The text signals 18 in this example are entered by a user from a keyboard, handwriting recognition, voice recognition or any other input method. In this embodiment, the rate of text character entry for text terminal 12 is usually around a few characters per second or less. Similarly, the text terminal 12 may only be able to receive and process a few characters from gateway 20 per second.

The opposite endpoint 34 may be a different type of terminal, such as a Personal Computer (PC). The PC 34 may have the ability to transmit and receive text characters at a faster rate than the text terminal 12. For example, the PC 34 may operate word processing software that can cut and paste large portions of text from a document. The cut and pasted text from the document may then be transmitted from the PC 34 at one time. Transmitting characters at a fast rate from PC 34 can cause buffers in the gateway 20 to overflow and eventually drop text characters.

To prevent this overflow situation, the MTI 25 can specify a maximum CPS rate 40. The gateway 20 includes the CPS rate 40 in the media session signaling that is conducted between the gateway 20 and the endpoint 34.

The endpoint 34 includes a character rate monitor 46 that uses the CPS rate 40 sent in the media session signaling to monitor the rate that characters is generated from a text generator 44. The character rate monitor 46 may be a piece of software that operates in the media transport session 22. The text generator 44 can be any combination of hardware or software that generates text characters 42 that are transmitted from endpoint 34 to endpoint 12. For example, the text generator 44 may be word processing software or could be a keyboard, handwriting recognition device, voice recognition device, etc.

The character rate monitor 46 prevents the text from being output from the PC 34 at a rate above the designated CPS rate 40. For example, the character rate monitor may detect that the text generator 44 is outputting characters 42 above the CPS rate 40. The character rate monitor 46 buffers the characters 42 in buffer 47 and outputs the characters at or below the designated CPS rate 40.

If the buffer 47 fills up, the character rate monitor 46 may prevent the text generator 44 from generating any more characters until some portion of the characters in buffer 47 have been successfully transmitted to the endpoint 12. This prevents the text generator 44 from overflowing buffers in the gateway 20 that are used for transferring text to the text terminal 12.

In one example, the CPS rate 40 is controlled using a Multipurpose Internet Mail Extensions (MIME) parameter "cps" in an "fmtp" attribute. It can be used in Session Description Protocol (SDP) with the following syntax:

a=fmtp:<format>cps=<integer>

The <format> field is populated with the payload type that is used for text. The <integer> field contains an integer representing the maximum number of characters that may be received per second. The value in the integer field can be used as a mean value over any time interval. This is just one example of how the CPS rate 40 might be specified. It should be understood that any other communication protocol or signaling process can be used for relaying the CPS rate to different network processing devices.

Figure 3:
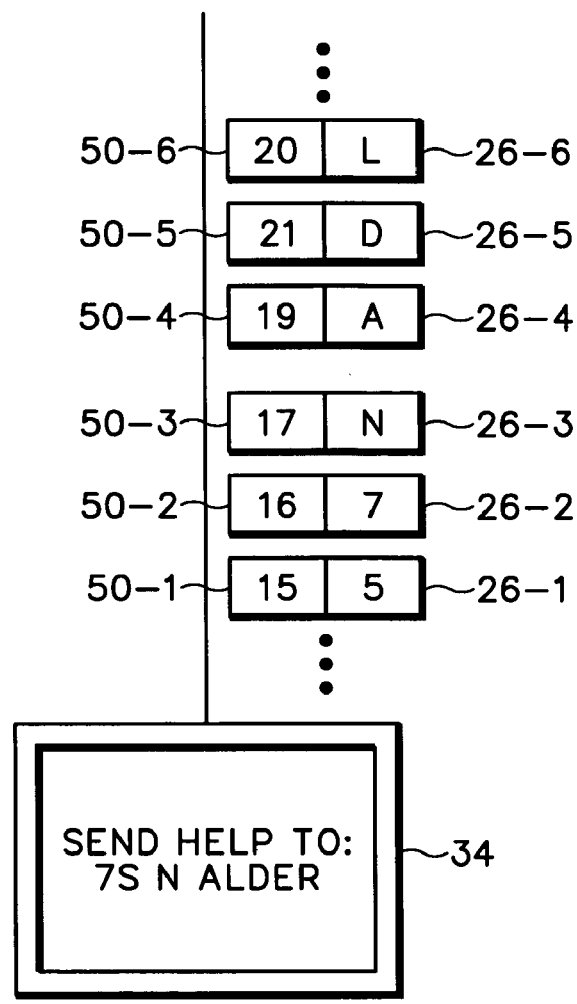
FIG. 3 is a diagram showing how a sequence of text characters in the MTI session are identified.

FIG. 3 shows another aspect of the MTI operation that maintains an order to the transmitted text characters. Multiple text packets 26_1 through 26_6 are shown that each contain a different character in a sequence of characters sent from a remote endpoint. A text counter field 50 is contained in the text packets 26 that identify the sequence that the text characters are transmitted. For example, the "5" character is transmitted in the 15th text packet 26_1 in the media session. The "7" character is transmitted in the 16th text packet 26_2 in the same media session and an "N" character is transmitted in the 17th text packet 26_3 in the same media session, etc.

In this example, the 18th text packet in the media session has been dropped somewhere in the IP network. Accordingly, the next text packet received by the endpoint 34 is the 19th text packet 26_4 that contains text character "A". The next two text packets arrive out of order with the 21st text packet 26_5 arriving before the 20th text packet 26_6.

The endpoint 34 buffers the text packets 26_1-26_6 and may wait some predetermined time before displaying the text characters on a screen. A text packet, such as the text packet associated with text counter value 18, may not be received within some predetermined about of time. In this case, the endpoint may use some means to indicate to the recipient that text was lost. An out of order text packet, such as text packet 26_6, may be received within the predetermined time period. In this case, the text character is rearranged in the correct order before being displayed by endpoint 34.

For example, the original text message sent from the originating endpoint stated: "Send help to: 75 NE Alder". The "E" character corresponding to text counter value 18 was never received by the endpoint 34 and therefore an apostrophe was inserted in its place. The text packet 26_5 containing the "D" character was received before the text packet 26_6 containing the "L" character. However, the text packet 26_6 was received within some predetermined time period after receiving text packet 26_5. As shown in FIG. 3, the endpoint 34 rearranges and displays the two characters in the correct numerical order specified by the text counter values 50.

Figure 4:
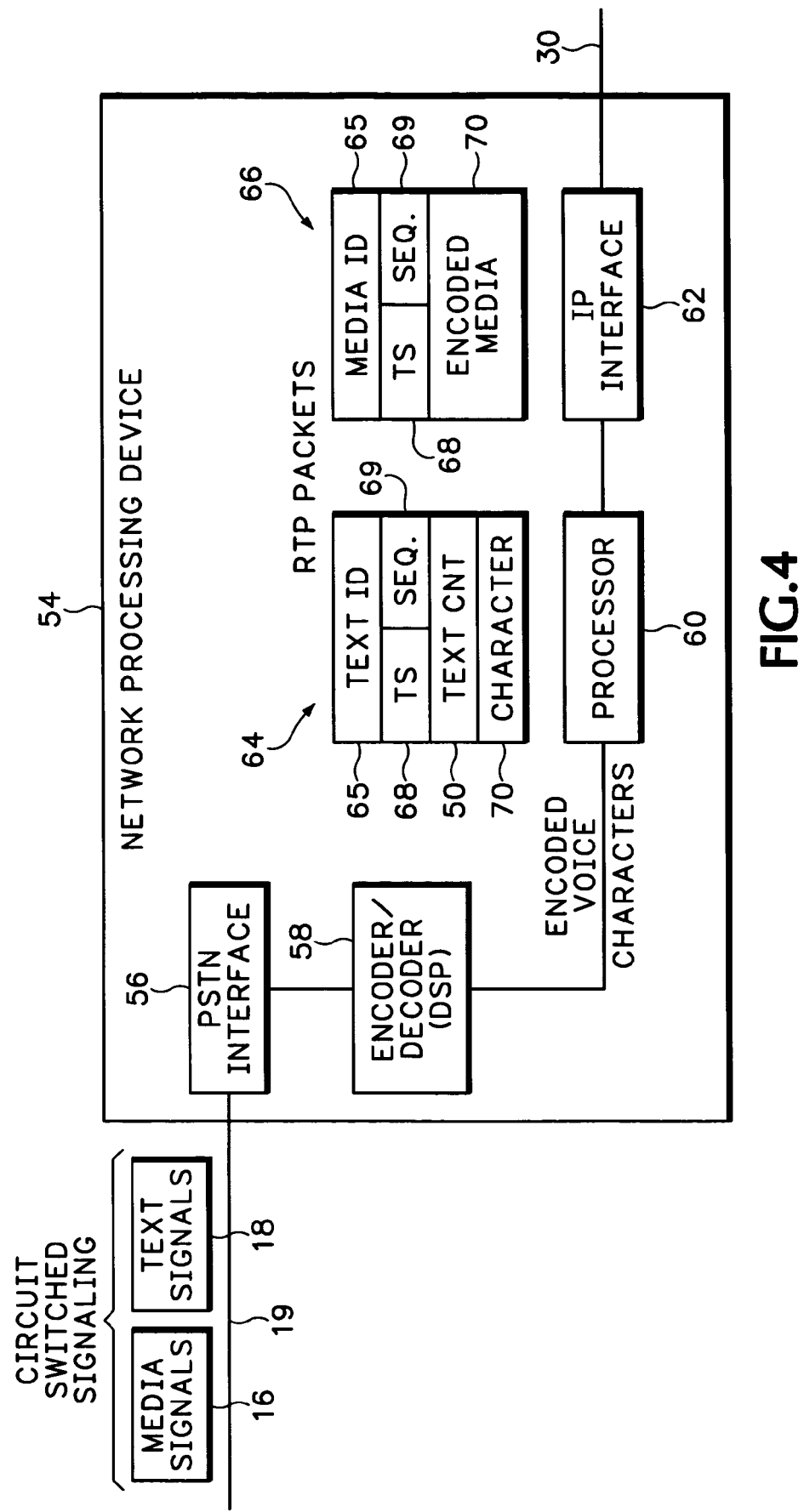
FIG. 4 is a more detailed diagram of a network device that is used for conducting the MTI session.

FIG. 4 shows in more detail a gateway, endpoint, or any other type of network processing device 54 that may provide some or all of the MTI operations described above. In this example, the network device 54 includes a PSTN interface 56 for communicating over a PSTN network 19. However, if the network device 54 is an IP device, the PSTN interface 56 may not be required.

An encoder/decoder 58 is used for encoding received PSTN signals and decoding encoded data received over the IP network 30. In one implementation, the encoder/decoder 58 is operated in a Digital Signal Processor (DSP). The same DSP 58, or a different more general purpose processor 60, formats the encoded signals into IP packets that include text IP packets 64 and media IP packets 66. The IP packets 64 and 66 are sent out over the IP network 30 via IP interface 62.

In one example, the IP packets 64 and 66 are RTP packets. The RTP packets 66 include, among other fields, a payload identifier field 65, timestamp field 68, sequence number field 69, and a packet payload 70. The processor 60 identifies and distinguishes the text packets 64 from the other media packets 66 according to the value used in the payload identifier field 65.

The same series of sequence numbers in field 69 and time stamps in field 68 are used for the text packets 64 and the other media packets 66. However, the text packets 64 may include an additional text counter field 50 to track the text character sequence as described above in FIG. 3. The processor 60 loads the text characters associated with the text signals 18 into the packet payload 70 for text packets 64 and loads compressed media for media signals 16 into the packet payload 70 for the media packets 66. It should be understood that the contents of the payload 70 in the text packets 64 is typically a series of binary, hex, etc. values that represent a particular text character.

Figure 5:
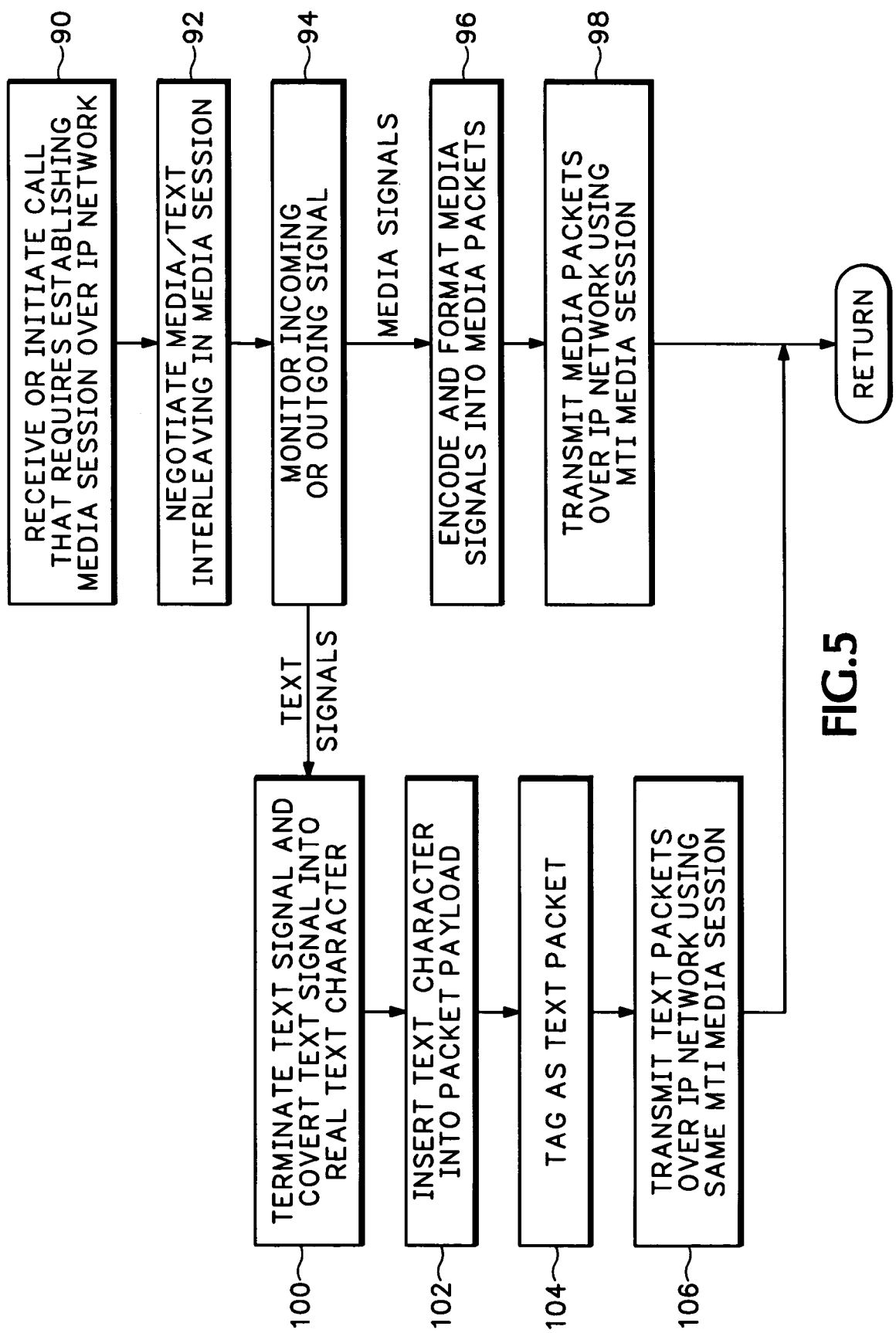
FIG. 5 is a flow diagram showing how the network device in FIG. 4 operates.

FIG. 5 explains in further detail the operations performed by the network processing device shown in FIG. 4. In box 90, the network device 54 (FIG. 4) receives or initiates a call that requires establishing a media session over an IP network. For example, the network device 54 may be a gateway that receives a telephone call from a text phone endpoint. In another example, the network processing device 54 may be an IP device that initiates or receives a call directly over the IP network without going through a gateway.

In block 92, the network device negotiates Media/Text Interleaving (MTI) in the media session with a destination endpoint or with a gateway associated with the destination endpoint. The media session may use any combination of the MTI operations described above in FIGS. 1-4.

After the MTI media session is established, the network device 54 monitors the incoming or outgoing signals in block 94. For instance, in the gateway example, the encoder/decoder DSP 58 (FIG. 4) in the network device 54 may identify and distinguish received PSTN tones associated with text characters from other PSTN signals that are associated with audio signals, or other types of media signals. In the IP device example, the encoder/decoder 58 may detect text and other media signals generated internally.

Media signals, other than text signals, are detected in block 94 are encoded and formatted into media packets in block 96. For example, the media packets may be formatted into conventional RTP packets by the processor 60 in FIG. 4. The media packets are then transmitted over the media session established over the IP network.

If text signals are detected in block 94, the DSP 58 will terminate the text signal and convert the text signal into a real text character in block 100. The text character is inserted into a packet payload in block 102 and then tagged as a text packet in block 104. The text packet is then transmitted over the IP network in block 106 using the same MTI media session used for transmitting any media packets in block 98.

The process of terminating text signals and converting the text signals into text characters as described above in block 100 is different from other processes used for converting text signaling into IP packets. For example, a gateway may transmit Dual Tone Multi-Frequency (DTMF) signals over an IP network. The RFC 2833 also describes a method for transmitting text over VoIP sessions.

The DTMF tones generated by an endpoint typically have an associated time characteristic. For example, a phone generates a DTMF tone for as long as a button on the phone is pressed. A gateway receiving the DTMF tone encodes both the tone duration and DTMF tone information into corresponding RTP packets. For example, if a phone user presses the "5" button on the phone for two seconds, the gateway encodes and formats RTP packets containing two seconds of DTMF tones corresponding to the pressed "5" button. The gateway may generate multiple RTP packets each containing a portion of the 2 seconds worth of DTMF "5" tones.

In RFC 2833, the gateway converts the DTMF tone associated with the pressed "5" button into a packet payload that identifies the event associated with pressing the "5" key. However, the gateway also adds volume and duration information identifying how long the "5" button was pressed.

Conversely, one aspect of the MTI operation is that the specific text character associated with a text signal is extracted from the PSTN signal while other analog signaling characteristics of the text signal are discarded. For example, the DSP 58 in FIG. 4 generates an RTP packet with a payload containing the digital equivalent of the "5" character without any corresponding duration or volume characteristic that may have been contained in the received text signals.

The network device 54 may reinstate some time sequence information back into the text packet by inserting the text counter value 50 into the text packets as described above. Thus, the MTI captures the digital meaning of the text signal without sending the time and other signaling information contained in analog audio signaling.

Converting the text signals 18 into digital text also has the advantage of increasing compatibility between different endpoints. For example, one text terminal may be configured to generate and receive Baudot tones while the opposite text terminal my use V.21 signaling. Converting the Baudot tones or V.21 tones into text, prevents each endpoint from having to convert back and forth between different text signaling protocols. Further, no Baudot or V.21 signal conversion is necessary for IP endpoints that communicate directly over the IP network.

Figure 6:
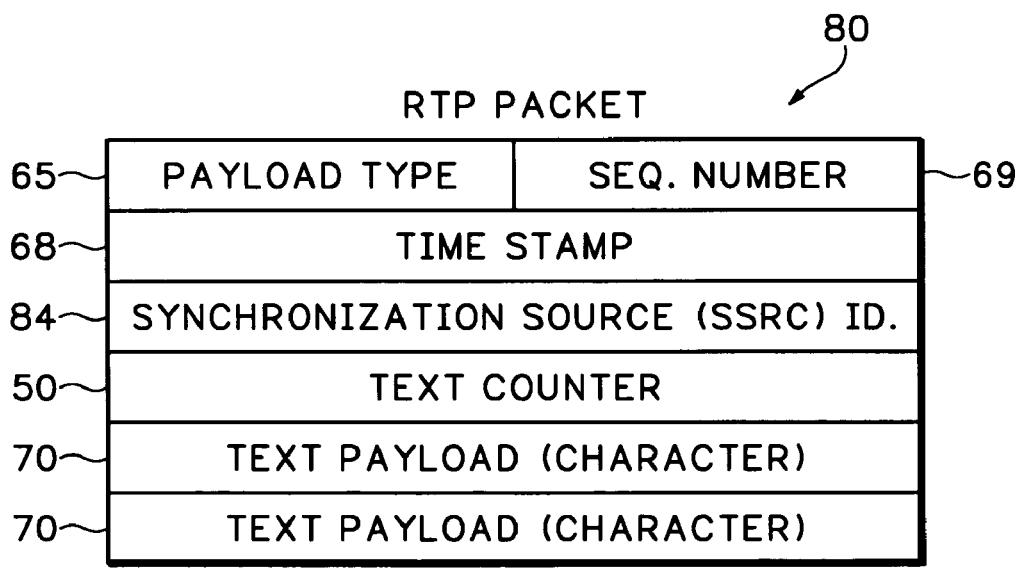
FIG. 6 is an example of an RTP packet that is used in the MTI session.

FIG. 6 shows one example of how MTI is implemented in an RTP packet 80. The RTP packet 80 includes a payload type field 65. If redundancy is used, additional different payload type numbers may be used. The payload type field 81 is conventional, but now includes a new payload type identifier that can distinguish text payloads from other types of media payloads. Again it should be understood that the implementation of the MTI system using RTP is just one example.

Some or all of the MTI system can be implemented in any other real-time transport system that currently exists or is developed in the future. In this document, references to RTP include any protocol that provides real-time transport of media packets. This may include IETF RFC 3550 (Real-Time Transport Protocol), RFC 3711 (Secure Real-Time Transport Protocol), or other real-time media transport protocols that currently exists or is developed in the future such as the Real-time streaming protocol.

A sequence number field 69 provides the conventional sequence number used in conventional RTP media sessions. Text packet loss as described above in FIG. 3 is detected through the text counter field 50. A timestamp field 68 encodes the approximate instance of entry of the primary text in the packet 80. For text packets, the clock frequency may be set to any value, and typically is set to the same value as for any media packets in the same RTP stream in order to avoid RTP timestamp rate switching.

The synchronization source (SSRC) identification field is the same as used in convention RTP sessions and identifies different media sources that may exist in the same endpoint. For example, two different audio formats can be sent within a same RTP session by using a different SSRC values. Such an end point will appear to others in the session as two participants with different SSRC, but the same RTCP SDES CNAME. The payload field 70 contains either media or text characters as described above. One or more text characters may be contained in the same packet payload 70.

Protection Against Loss of Data Loss of text caused by packet loss can be kept within acceptable limits. One technique may explicitly select redundancy in accordance with RFC 2198. When this technique is used, the original text and one or more redundant generations of the text are used. Other protection methods may also be used. Forward Error Correction mechanisms as per RFC 2733 or any other mechanism with the purpose of increasing the reliability of text transmission may be used as an alternative or complement to redundancy.

When using redundant data, the same character may be transmitted more than once in the media stream. The RTP header may be followed by one or more redundant data block headers, one for each redundant data block to be included. Each of these headers may provide the timestamp offset and length of the corresponding data block plus a payload type number indicating the text payload type. Alternatively, redundant data fields may carry text characters from previous packets, and the new primary text character for the present packet.

Even if the network load from users of text conversation is very low, for best-effort networks an application may monitor the packet loss rate and take appropriate actions to reduce the sending rate if necessary to reduce congestion and reduce the number of dropped packets. The sending rate may be reduced, by increasing the shortest time between transmissions, limit the maximum character transmission rate, or increase the shortest time between transmissions to a higher value.

The MTI system could also be used to provide closed captioning within an audio stream for the deaf and hard of hearing, to provide textual information along with audio from an Interactive Voice Recognition (IVR) system, or to allow users to enter textual information, as well as spoken words, to systems expecting input.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A method for transporting text in a real-time Internet Protocol (IP) media transport session, comprising:
   receiving text signaling from a network or from a text generation device;
   converting the text signaling into text characters;
   formatting the identified text characters into Real Time Protocol (RTP) text packets that are associated with the real-time IP media transport session;
   generating RTP media packets that are also associated with the same real-time IP media transport session;
   receiving analog tones representing text characters;
   extracting a digital meaning from the analog tones;
   discarding other analog volume and duration signaling characteristics from the analog tones;
   converting the digital meaning of the analog tones into a corresponding real text character;
   formatting the real text character into a packet payload in one of the RTP text packets without sending the discarded volume and duration signaling characteristics from the analog tones
   interleaving the RTP text packets with the RTP media packets;
   assigning sequentially increasing packet numbers to each of the individual interleaved RTP text packets and RTP media packets that correspond to a sequential combined order that each of the interleaved RTP text packets and RTP media packets are sent on a packet switched network and that all correspond with the single same real-time IP media transport session;
   sending the interleaved text packets and media packets over the packet switched network using the same single real-time IP media transport session.

2. The method according to claim 1 wherein:
   the RTP text packets and the RTP media packets both include a payload identifier field, a timestamp field, a sequence number field, and a packet payload;
   the same continuous sequential series of sequence numbers are used in the sequence number field according to an associated sequence of the interleaved RTP text packets and the interleaved RTP media packets;
   the RTP text packets are distinguished from the RTP media packets by different values in the payload identifier field; and
   an additional text counter field is used only in the RTP text packets to track a text character sequence contained in the RTP text packets.

3. The method according to claim 1 including adding a second text sequencing only to the RTP text packets that sequentially numbers the RTP text packets in an order transmitted in the IP media transport session independently of the sequential packet numbers used for the interleaved RTP media and RTP text packets.

4. The method according to claim 1 including specifying, in a media-signaling session prior to sending the RTP text packets, a character rate that controls a maximum rate that text characters can be transmitted in RTP text packets during the real-time IP media transport session as a preventative against dropping of text packets.

5. The method according to claim 1 including carrying the interleaved RTP media packets and RTP text packets over a same Real-time Transport Protocol (RTP) or Secure RTP (SRTP) real-time IP media transport session.

6. The method according to claim 5 including identifying the RTP text packets by using a RTP or SRTP payload type identifier in an RTP or SRTP packet header.

7. The method according to claim 5 including using a text counter field in an RTP or SRTP packet to identify a RTP text packet sequence during an RTP or SRTP session.

8. The method according to claim 1 including:
receiving the text signaling over a Public Switched Telephone Network (PSTN);
converting the text signaling into Internet Protocol (IP) text packets;
receiving media signaling over the PSTN network;
converting the media signaling into IP media packets; and
transporting the IP text packets and the IP media packets over the same real-time IP media transport session.

9. A network processing device, comprising:
a processor configured to:
convert media signaling into Internet Protocol (IP) media packets;
receive text signaling comprising different analog audio tones representing different alpha-numeric characters;
identify the alpha-numeric characters represented by the analog audio tones and generate digital values that represent the same identified alpha-numeric characters;
formatting the digital values into IP text packets absent analog signaling characteristics describing the audio tones; and
sending the IP media packets and the IP text packets in interleaved manner over an IP network using the same real-time IP transport session.

10. The network processing device according to claim 9 wherein the processor terminates the text signaling and generates digital values representing text characters identified in the text signaling.

11. The network processing device according to claim 9 including a Public Switched Telephone Network (PSTN) interface for receiving and transmitting the text and media signaling and an IP interface for sending and receiving the IP text and IP media packets.

12. The network processing device according to claim 9 wherein the processor transports the text packets such that the text packets share the same sequencing series as the media packets.

13. The network processing device according to claim 9 wherein the processor specifics a first sequentially increasing packet number sequencing for the combination of IP media and IP text packets in the real-time IP transport session and specifies a second different sequentially increasing packet number sequencing just for the IP text packets.

14. The network processing device according to claim 9 wherein the processor specifies, in a media-signaling session prior to sending the text packets, a character rate that controls a maximum transfer rate for transferring characters in the IP text packets during the real-time IP media transport session as a preventative against dropping of text packets.

15. The network processing device according to claim 9 wherein the real-time IP transport session uses a Real-time Transport Protocol (RTP) or a Secure RTP (SRTP).

16. The network processing device according to claim 9 wherein the network processing device is a Public Switched Telephone Network (PSTN) to Internet Protocol (IP) network gateway.

17. The network processing device according to claim 9 wherein the network processing device is a IP device that communicates directly over an IP network without going through a gateway.

18. The network processing device according to claim 9 wherein the network processing device communicates over an IP network through a gateway.

19. The network processing device according to claim 9 wherein the text signaling is received over a PSTN network from a TTY/TTD text terminal.

20. A computer readable medium having a program for transporting text in a real-time Internet Protocol (IP) media transport session, the program when executed comprising:
receiving text signaling from a network or from a text generation device, the text signaling comprising tones representing text characters;
identifying the text characters represented by the tones;
formatting digital values representing the identified text characters into text packets while discarding other analog signaling characteristics from the tones; and
sending the text packets over the same real-time IP media transport session used for transporting media packets without sending the discarded analog signaling characteristics from the analog tones.

21. The computer readable medium according to claim 20 wherein the program when executed includes transporting the text packets such that the text packets share the same incrementing sequencing series with the media packets.

22. The computer readable medium according to claim 20 wherein the program when executed includes adding a different incrementing text sequencing to the text packets that identify a sequence that the text characters are transmitted in the IP media transport session.

23. The computer readable medium according to claim 20 wherein the program when executed includes specifying, in a media-signaling session prior to sending the text packets, a character rate that controls a maximum rate that text characters can be transmitted in text packets during the real-time IP media transport session as a preventative against dropping of text packets.

24. The computer readable medium according to claim 20 wherein the program when executed includes using Real-time Transport Protocol (RTP) or Secure RTP (SRTP) for the real-time IP media transport session.

25. The computer readable medium according to claim 24 wherein the program when executed includes identifying the text packets by using a RTP or SRTP payload type identifier in an RTP or SRTP packet header.

26. The computer readable medium according to claim 24 wherein the program when executed includes using a text counter field in an RTP or SRTP packet to identify a text packet sequence during an RTP or SRTP session.

27. The computer readable medium according to claim 20 wherein the program when executed includes:
receiving the text signaling over a Public Switched Telephone Network (PSTN);
converting the text signaling into Internet Protocol (IP) text packets;

receiving media signaling over the PSTN network;

converting the media signaling into IP media packets; and transporting the IP text packets and the IP media packets over the same real-time IP media transport session.

28. The computer readable medium according to claim 20 wherein the program when executed includes processing TTY/TTD text signaling.

29. A system for transporting text in a real-time Internet Protocol (IP) media transport session, comprising:

means for receiving text signaling from a network or from a text generation device;

means for identifying text characters represented by the text signaling;

means for formatting the identified text characters into text packets; and means for sending the text packets over the same real-time IP media transport session used for transporting media packets, wherein the text packets and media packets are assigned shared sequentially increasing packet numbers in a sequential incrementally increasing order that the combination of the test packets and media packets are each sent in the media transport session, wherein:

the text signaling includes analog tones representing the text characters;

said means for identifying extracts a digital meaning from the analog tones and discards other analog signaling characteristics from the analog tones;

said means for formatting converts the identified digital meaning of the analog tones into corresponding digital values that represent the text characters and formats the digital values into a packet payload in one of the text packets; and said means for sending sends the text packets without including the other discarded analog signaling characteristics from the analog tones.

30. The system according to claim 29 including means for adding text sequencing to the text packets that identify a sequence that the text characters are transmitted in the IP media transport session.

31. The system according to claim 29 including means for specifying, in a media-signaling session prior to sending the text packets, a character rate that controls a maximum rate that text characters can be transmitted in text packets during the real-time IP media transport session as a preventative against dropping of text packets.

32. The system according to claim 29 including means for using Real-time Transport Protocol (RTP) or Secure RTP (SRTP) for the real-time IP media transport session.

33. The system according to claim 32 including means for identifying the text packets by using a RTP or SRTP payload type identifier in an RTP or SRTP packet header.

34. The system according to claim 32 including means for using a text counter field in an RTP or SRTP packet to identify a text packet sequence during an RTP or SRTP session.

35. The system according to claim 29 including:

means for receiving the text signaling over a Public Switched Telephone Network (PSTN);

means for converting the text signaling into Internet Protocol (IP) text packets;

means for receiving media signaling over the PSTN network;

means for converting the media signaling into IP media packets; and means for transporting the IP text packets and the IP media packets over the same real-time IP media transport session.

36. The system according to claim 29 wherein the text signaling is TTY/TTD signaling.

* * * * *

UNITED STATES PATENT AND TRADEMARK OFFICE
CERTIFICATE OF CORRECTION

PATENT NO. : 7,656,861 B2
APPLICATION NO. : 10/982620
DATED : February 2, 2010
INVENTOR(S) : Jones et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 953 days.

Signed and Sealed this

Twenty-eighth Day of December, 2010

David J. Kappos
*Director of the United States Patent and Trademark Office*

UNITED STATES PATENT AND TRADEMARK OFFICE
CERTIFICATE OF CORRECTION

PATENT NO. : 7,656,861 B2
APPLICATION NO. : 10/982620
DATED : February 2, 2010
INVENTOR(S) : Jones et al.

It is certified that error appears in the above-identified patent and that said Letters Patent is hereby corrected as shown below:

IN THE CLAIMS:

At column 9, line 59, claim 13, please replace "specifics" with --specifies--.
At column 11, line 21, claim 29, please replace "test" with --text--.

Signed and Sealed this
Twenty-eighth Day of February, 2012

David J. Kappos
*Director of the United States Patent and Trademark Office*